United States Patent
Gautier et al.

(10) Patent No.: US 6,651,930 B1
(45) Date of Patent: Nov. 25, 2003

(54) PROCESS AND CONTROL SYSTEM FOR AN AIRCRAFT CONTROL SURFACE ACTUATED BY MULTIPLE HYDRAULIC JACKS AND WITH MODULAR POWER

(75) Inventors: Jean-Pierre Gautier, Toulouse (FR); Cécile Peransin-Delage, Montaigut sur Save (FR)

(73) Assignee: Aerospatiale Matra, Paris (FR)

( * ) Notice: Subject to any disclaimer, the term of this patent is extended or adjusted under 35 U.S.C. 154(b) by 0 days.

(21) Appl. No.: 09/467,299

(22) Filed: Dec. 17, 1999

(30) Foreign Application Priority Data

Dec. 28, 1998 (FR) .............................. 98 16495

(51) Int. Cl.[7] .............................................. B64C 13/04
(52) U.S. Cl. ..................... 244/75 R; 244/78; 244/226; 244/194
(58) Field of Search ............................ 244/78, 203, 230, 244/223, 75 R, 220, 221, 213, 226, 194, 199; 60/390, 387

(56) References Cited

U.S. PATENT DOCUMENTS

| | | | |
|---|---|---|---|
| 3,426,650 A | * 2/1969 | Jenny | 244/78 |
| 3,549,108 A | * 12/1970 | Smith | 244/194 |
| 3,678,256 A | * 7/1972 | Harenberg, Jr. | 244/195 |
| 3,898,916 A | * 8/1975 | Renner et al. | 244/194 |
| 3,940,094 A | * 2/1976 | Kress et al. | 244/194 |
| 3,955,783 A | * 5/1976 | Glaze et al. | 244/194 |
| 4,087,065 A | * 5/1978 | Arnquist et al. | 244/213 |
| 4,372,507 A | * 2/1983 | Denniston | 244/213 |
| 4,447,769 A | * 5/1984 | Corney | 244/194 |
| 4,598,890 A | 7/1986 | Herzog et al. | 244/230 |
| 4,651,045 A | * 3/1987 | Wagner | 244/75 R |
| 4,667,472 A | * 5/1987 | Clay et al. | 60/387 |
| 4,744,532 A | 5/1988 | Ziegler et al. | |
| 4,754,940 A | * 7/1988 | Deter | 244/75 R |
| 4,762,294 A | * 8/1988 | Carl | 244/75 R |
| 4,765,568 A | * 8/1988 | Carl et al. | 244/75 R |
| 4,789,119 A | * 12/1988 | Bellego et al. | 244/226 |
| 4,793,137 A | * 12/1988 | Munk | 60/390 |
| 4,793,576 A | * 12/1988 | Frerk | 244/75 R |
| 4,807,516 A | * 2/1989 | Takats | 244/194 |

FOREIGN PATENT DOCUMENTS

| | | | |
|---|---|---|---|
| FR | 2569787 | 3/1986 | |
| GB | 2196910 | 5/1988 | ........... B64C/13/40 |

OTHER PUBLICATIONS

Straub, H.H. et al. *747–400 upper rudder control system*, Aerospace Engineering, Jun. 1992: 11–14.

* cited by examiner

*Primary Examiner*—Galen L. Barefoot
(74) *Attorney, Agent, or Firm*—Robert E. Krebs; Thelen Reid & Priest, LLP

(57) ABSTRACT

Control system for a control surface (100) of an aircraft comprising at least one actuator (102, 104) of the control surface, connected to a hydraulic circuit and equipped with at least two power jacks (110) capable of operating in at least one activated mode and one deactivated mode. According to the invention, the system also comprises a control unit (114) capable of making a number of jacks operate in activated mode depending on the aircraft flight conditions.

Application to aircraft.

22 Claims, 3 Drawing Sheets

PROCESS AND CONTROL SYSTEM FOR AN AIRCRAFT CONTROL SURFACE ACTUATED BY MULTIPLE HYDRAULIC JACKS AND WITH MODULAR POWER

TECHNICAL FIELD

This invention relates to a control system for an aircraft control surface using multiple hydraulic jacks and a process for management of the operation of control surface actuation jacks.

The process according to the invention may be used on aircraft, particularly on commercial transport aircraft and supersonic aircraft. For example, it may be applied to trailing edge control surfaces such as riders, elevators or ailerons, or to any other control surface on the aircraft.

STATE OF PRIOR ART

In general, aircraft control surfaces are activated by several servo-controlled actuators and are energized by one or several hydraulic circuits.

An aircraft may be equipped with a number of hydraulic circuits pressurized through proportion units. It may also be equipped with stand alone hydraulic circuit pressurized by an electric pump. Actuators may comprise one or several hydraulic jacks. In this respect, refer to documents (1) and (2), the reference of which are given at the end of this description.

The number and dimensions of jacks are determined as a function of the maximum aerodynamic loads that may be exerted on the corresponding control surfaces.

Furthermore, the hydraulic flow necessary to maneuver the control surfaces is proportional to the amplitude and displacement speed of the control surfaces.

But the movement amplitude of control services and the movement speed are usually maximum during take off and landing phases.

During this flight phases, a number of other actuators such as actuators governing the retraction or extension of a landing gear also require a large hydraulic flow.

The result is that aircraft hydraulic circuits need to be very conservatively designed, in order to provide the large hydraulic flows necessary during the landing and take off phases. Consequently, hydraulic circuits create size and weight problems.

DESCRIPTION OF THE INVENTION

The purpose of this invention is to propose a control system for an aircraft control surface capable of operating with reduced hydraulic circuits, while being capable of maneuvering control surfaces under flight conditions in which aerodynamic loads are maximum.

Another purpose is to propose a control system that can operate with a reduced hydraulic flow during the take off and landing phases, in other words particularly when starting operation with other equipment such as landing gear, that also consume hydraulic power.

Another purpose is to propose this type of system in which actuators may be laid out more easily in thin profiles such as wing elements, minimizing the size of fairings.

In order to achieve these purposes, the purpose of the invention is more particularly a control system for an aircraft control surface comprising at least one control service actuator equipped with at least two power jacks capable of operating according to at least one activated mode and one deactivated mode. According to the invention, the control system comprises a control unit capable of making a number of jacks operate in an active mode depending on aircraft flight conditions. In particular, the control unit may be designed to determine a force to be exerted on the control surface, and be connected to the said actuator to make a number of jacks depending on the said force to be exerted, in an activated mode.

The control surface is maneuvered by one or several actuators that may be connected to different hydraulic circuits on the aircraft, respectively.

An activated mode is a power jack operation mode in which the power jack actively participates in moving a control surface by exerting forces causing clearance on the control surface. In the case of a hydraulic jack with two chambers, the chambers are then connected to a hydraulic power source such as a hydraulic circuit providing energy to the jack to actuate the control surface.

Deactivated mode is an operating mode in which the power jack forms the movement of the control surface without provoking it. In the case of a hydraulic jack, the jack chambers are then usually connected to each other through a restrictor to absorb the movement of the control surface.

When forces to be exerted on the control surface are small, which is typically the case when the aircraft speed is low, only a small number of jacks provided on at least one actuator, for example a single jack, may be used in the activated mode.

Thus, according to the invention, during take off landing when the amplitude and displacement speed of the control surfaces are large but the force to be exerted is small, only a small number of jacks equipping an actuator may be energized.

In the case of hydraulic jacks used on an actuator, the fact that only a small number jacks are linked to the hydraulic circuit powering this actuator means that only a small flow of pressurized fluid is necessary. Therefore some of the hydraulic energies are available for other equipment such as actuator jacks for extending or retracting landing gear.

Conversely, when forces to be exerted are high, in other words at high aircraft speed, a larger number, or all of the jacks equipping at least one actuator may be controlled to operate in activated mode.

High aircraft speeds are reached during the "cruising"0 flight phase. During this flight phase, forces to be exerted on control surfaces are high, but the amplitude and movement speed of the control surfaces are usually low. In the case of hydraulic jacks, all jacks used in an actuator that can then be connected to the hydraulic circuit powering this actuator without requiring an excessive fluid flow.

Thus, according to the invention, small hydraulic systems can be used and the jacks equipping an actuator are small and can be housed in smaller sized fairing or thin profiles. These advantages are particularly useful for supersonic aircraft.

According to one particular embodiment of the system according to the invention, the control unit is connected to a control surface position sensor and to a control device. It may then comprise a programmed computer to determine a minimum number of jacks equipping at least one actuator and necessary to cause movement of the control surface with an amplitude corresponding to a control order originating from the control device.

Alternatively, the control unit may also be combined with flight control order calculation and generation means depending on specific flight phases. The control unit is then designed to associate a given number of jacks equipping an actuator depending on activated mode, for each flight phase.

The means of calculating and generating flight control order may comprise an aircraft computer equipped with one or more redundant calculation units. For example, this type of computer can make a distinction between flight phases such as take off, initial claim, cruising phase, descending phase, approach phase and finally taxing.

A certain number of jacks equipping an actuator to operate in activated mode, and a number of jacks operating in deactivating mode, can be associated with each flight phase in a determined manner.

For example, the computer may be programmed for a given control surface, so as to operate single jack for a given actuator in activated mode during take off from taxing phases, or to operate two jacks in the initial climb and approach phases, and to make three jacks operate in the cruising and descending phases.

According to another variant embodiment of the system according to the invention, the control unit may also be associated with means of measuring an aircraft speed and may be designed to operate a number of jacks that increases with the aircraft speed for a given actuator, in activated mode.

In this case, the control unit may be programmed to operate a single jack in the aircraft low speed range for a given actuator, and to make two or more jacks operate in the mean and high speed ranges.

As mentioned previously, forces to be exerted on control surfaces are higher at high speeds, and therefore it is desirable that a large number of jacks should operate in activated mode. However, activation of large number of jacks does not require a large hydraulic flow to the extent that the movement of control surfaces is usually low at high aircraft speeds and takes place at low speed.

Within a low aircraft speed range, in which a high movement amplitude and hydraulic flow are necessary, but in which forces to be supplied are moderate, a small number of jacks equipping an actuator may be activated.

In the particular embodiment of actuators of a control surface, the actuators may comprise control blocks associated with jacks equipping them, these blocks being controlled from the control unit, in order to selectively make jacks operate according to an activated mode or a deactivated mode.

For example, for hydraulic jacks that comprise two jacks chambers separated by a mobile piston, control blocks may comprise mode drawers in order to selectively connect jack chambers to at least one hydraulic power source in activated mode, and to connect jack chambers to each other possibly through a restrictor, in deactivated mode.

The mode drawer may be associated with each jacks equipping an actuator.

According to one particular aspect of the invention, at least one of the jacks equipping an actuator may be associated with the three position mode drawer in order to form a passage between jack chambers in deactivated mode, to connect jack chambers to a hydraulic circuits through a servo-valve in a first activated mode, and to connect jack chambers to an electro-hydrostatic module forming a local and stand alone hydraulic power source in a second activated mode.

According to another particular aspect of the invention, an actuator may comprise at least two jacks each equipped with the mode drawer, in which at least one of the jacks is associated with the servo valve connected to the hydraulic circuit that forms a first hydraulic power source, and in which at least one of the jacks is associated with a stand alone electro-hydrostatic module forming a second local hydraulic power source.

The invention also relates to a control process for an aircraft control surface equipped with at least one actuator equipped with at least two jacks that can operate selectively in activated mode or deactivated mode. According to this process, in activated mode, the number of jacks that are made to operate depend on the aircraft speeds, or other particular conditions such as the flight phase.

In one particular embodiment of the process, a single jack equipping at least one actuator can be operated in activated mode when the aircraft speed is within a first low speed range, and two or more jacks equipping at least one actuator can be operated when the aircraft speed is in a second speed range greater than the speed in the first range.

As mentioned before, the said number of jacks to be activated can be determined as a function of the flight phase corresponding to determined speed.

Finally, a number of jacks equipping an actuator depending on the force to be exerted on the control surface to obtain a required movement, can be operated selectively in an activated mode or a deactivated mode.

Other characteristics and advantages of the invention will become clear from the following description with respect to figures in the attached drawings. This description is provided for illustrative purposes only, and is in no way restrictive.

DETAILED DESCRIPTION OF EMBODIMENTS OF THE INVENTION

Figure 1:
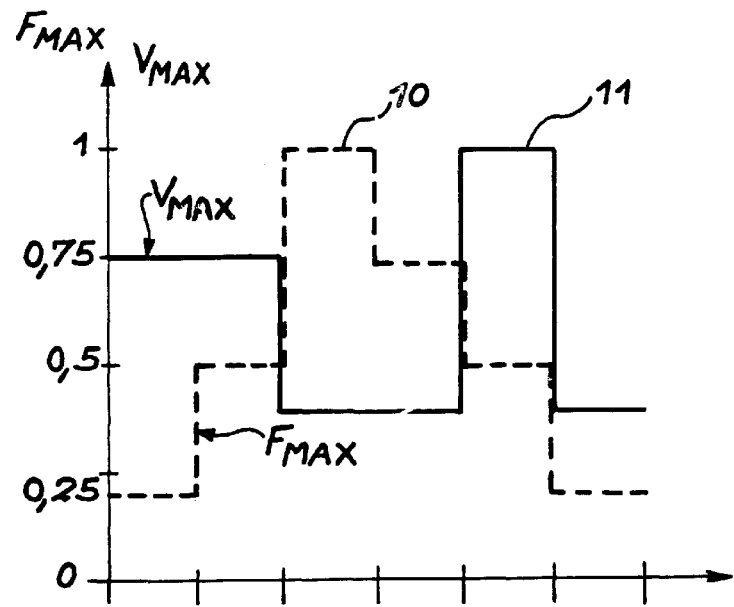
FIG. 1 is a diagram showing the typical variation of aerodynamic loads exerted on aircraft control services in different flight phases, and their maximum movement speed.

The bottom part of the diagram in FIG. 1 shows the various flight phases of an aircraft, and the ordinate shows firstly the maximum aerodynamic load $F_{max}$ applied to a control surface and secondly a maximum movement speed $V_{max}$ required for the control surface.

The ordinates axis is expressed in an arbitrary scale between 0 and 1.

The various flight phases are take off, initial climb, cruising speed, descent, approach and taxing phase, in the order shown on the figure.

There is a specific aircraft speed range for each flight phase. Speeds are high during the cruising phase, and to a lesser extend during the descent phase. However, aircraft speeds are significantly lower during the take off, initial climb, approach and taxing phases.

A discontinuous line 10 shows a typical variation of the aerodynamic force applied on the control surface during the different flight phases.

During the cruising and descent phases, in other words when the aircraft speed is high, it is seen on the aerodynamic load is high. Forces to be exerted by jacks on the control surface of consequently large and, in accordance with the invention, a large number of jacks equipping a given actuator need to be operated in order to maneuver the control surface.

Conversely, during the initial climbing and approach phases, but also during take off and taxiing, aerodynamic loads and therefore forces to be exerted are lower. Therefore a smaller number of jacks equipping a given actuator may be activated. Thus, in the case of hydraulic jacks, a smaller quantity of pressurized hydraulic fluid may be used and a higher hydraulic flow may be set aside for other aircraft equipment.

The continuous line 11 in FIG. 1 shows a typical variation of the maximum movement speed $V_{max}$ of the control surface for each flight phase.

It is observed that flight phases corresponding to maximum aerodynamic loads are also the phases during which the movement speed $V_{max}$ are lowest.

Thus during these phases, the amount of hydraulic fluid necessary for actuation of the control surface remains moderate, even when several actuator jacks are activated.

Figure 2:
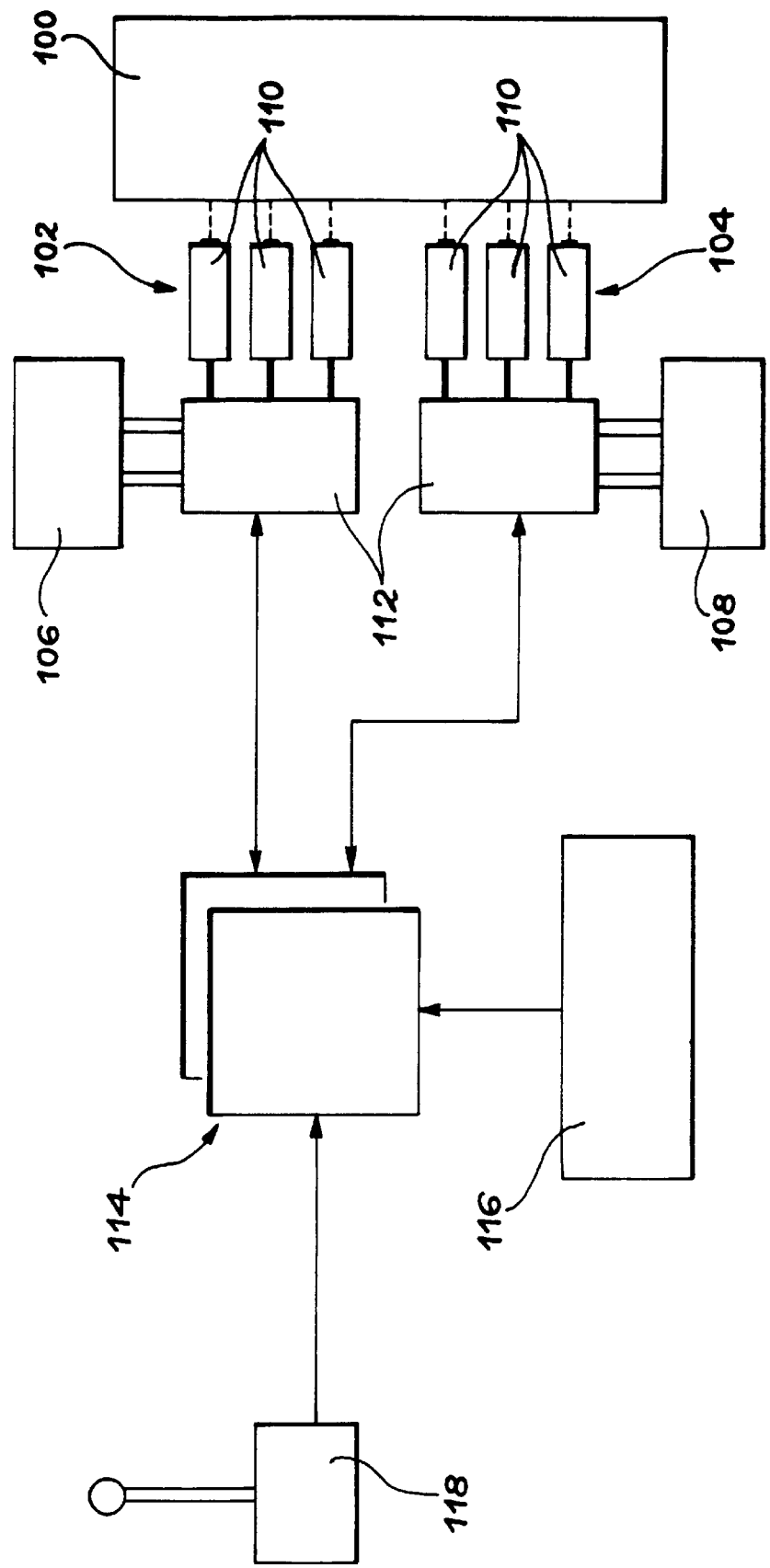
FIG. 2 is a simplified diagram containing a diagrammatic representation of a control system for a control surface according to the invention.

FIG. 2 contains a very simplified diagram showing a number of elements of a control surface control system according to the invention.

For example, a control surface 100, for example a rudder, is actuated by at least two actuators 102, 104, connected to two different hydraulic circuits 106, 108 respectively, and each equipped with three hydraulic jacks identified by references 110.

Each actuator also comprises a control block 112 that operates jacks in a deactivated mode or an activated mode, and that distributes a hydraulic power proportional to flight control orders to the activated jacks.

Flight control orders and orders designed to make a variable number of jacks operate in activated mode or deactivated mode are determined by a computer 114 provided with one or several calculation units and which forms part of the actuator control unit according to the invention.

The computer 114 is connected to a number of flight parameter measurement equipment, for example such as aircraft speed measurement devices. This equipment is globally identified with reference 116.

Finally, control devices 118, for example such as a stick or a control bar camera are connected to the computer in order to transmit piloting orders.

As mentioned previously, the computer 114 is used to control the number of jacks operating in activated mode for each actuator. Since each actuator is equipped with 3 jacks, the number of jacks operating in activated mode may vary from 1 to 6 or from 2 to 6 if the two actuators operate simultaneously.

Figure 3:
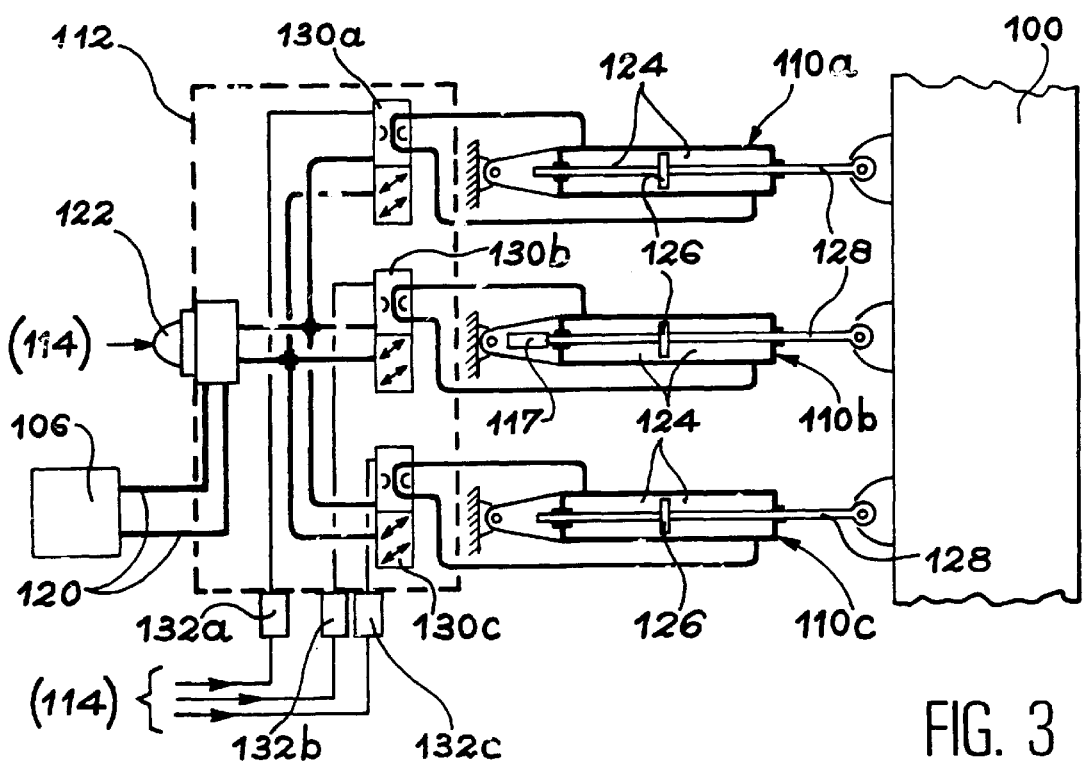
FIG. 3 is a simplified diagrammatic and enlarged view of a detail in FIG. 2 corresponding to one particular embodiment of the invention.

FIG. 3 shows the construction of a control surface actuator in more detail.

For simplification reasons, elements in FIG. 3 and the following figures that are identical, similar or equivalent to the elements of FIG. 2, are identified with the same numeric references.

The control block 112 is represented very diagrammatically in FIG. 3. It has a hydraulic fluid inlet and outlet 120 connected to a hydraulic circuit 106 and a servo valve 122. The servo valve receives electrical orders generated by the computer 114 (not shown) and distributes a hydraulic fluid flow to the jacks, when they are operating in activated mode, depending on the electrical orders received. In FIG. 3, the electrical orders are simply shown by an arrow.

The power jacks identified by references 110a, 110b and 110c each comprise two jack chambers separated by a piston 126. The piston in each jack is fixed to a jack rod 128 connected to the control surface 100. Note that power jacks are shown separately in FIGS. 2 to 5. However, they may also be adjacent in one particular embodiment.

Control blocks 112 are equipped with a mode drawer, 130a, 130b and 130c for each jack. Mode drawers 130a, 130b and 130c shown in FIG. 3 are piloted by solenoid valves 132a, 132b and 132c respectively, controlled by the computer 114, in order to make the mode drawer occupy one of two positions corresponding to activated and deactivated operating modes of the jacks, respectively.

In a first position of the mode drawers, the corresponding jack chambers are connected together through a restrictor. The jack then operates in a deactivated or dampened mode in which it passively "follows" the movement of the control surface.

In a second position of mode drawers, the drawers form passages between the corresponding jack chambers and the hydraulic circuit 106 through servo valve 122. The jacks are then in activated mode and piston and rod displacements are proportional to the fluid flow output through the valve, in other words are proportional to the flight control orders output by the computer to the servo valve.

Actuation of one of several solenoid valves 132a, 132b and 132c by the computer displaces mode drawers and changes the corresponding jacks from activated mode to deactivated mode, or vice versa.

It may be observed that one of the jacks 110b is equipped with a displacement sensor 117 on rod 128, for example in order to servo control jacks through computer 114.

Figure 4:
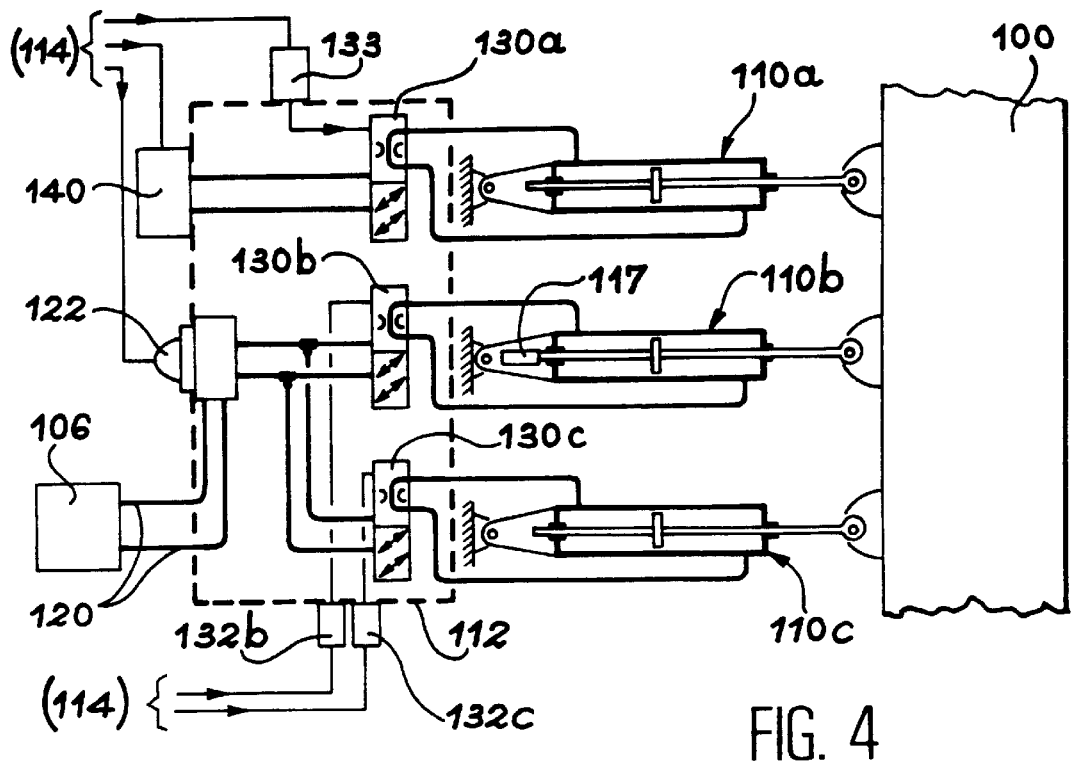
FIG. 4 is a simplified diagrammatic and enlarged view of a detail in FIG. 2 corresponding to one particular embodiment of the invention.

FIG. 4 shows a variant embodiment of the control block 112 and the jack energy power supply.

FIG. 4 shows only two jacks 110b, 110c may be connected to the hydraulic circuit 106 through the servo valve 122 (in activated mode). Mode drawers 130b and 130c of these jacks are controlled by solenoid valves 132b, 132c.

The mode drawer 130a for the first jack 110a is moved by a solenoid 133 controlled from a computer 114 (shown in FIG. 2). In a first position, the mode drawer 130a connects jack chambers 124. This position corresponds to deactivated mode, as described above.

In a second position corresponding to activated mode, the mode drawer forms a passage between jack chambers and a standalone electro-hydrostatic unit 140. The electro-hydrostatic unit 140 is equipped with an electric pump and is powered with electrical energy. It is capable of producing a hydraulic power proportional to control orders provided to it by the computer. As for the servo valve, control orders from the computer are shown by a single arrow.

In the embodiment shown in FIG. 4, the hydraulic circuit 106 forms a first source of hydraulic power and the electro-hydrostatic module 140 forms a second hydraulic power source.

With this arrangement, the mechanical power output to the control surface may be modulated and may be taken from two independent power sources. Operating reliability is improved and the size of hydraulic circuits may be made even smaller.

Figure 5:
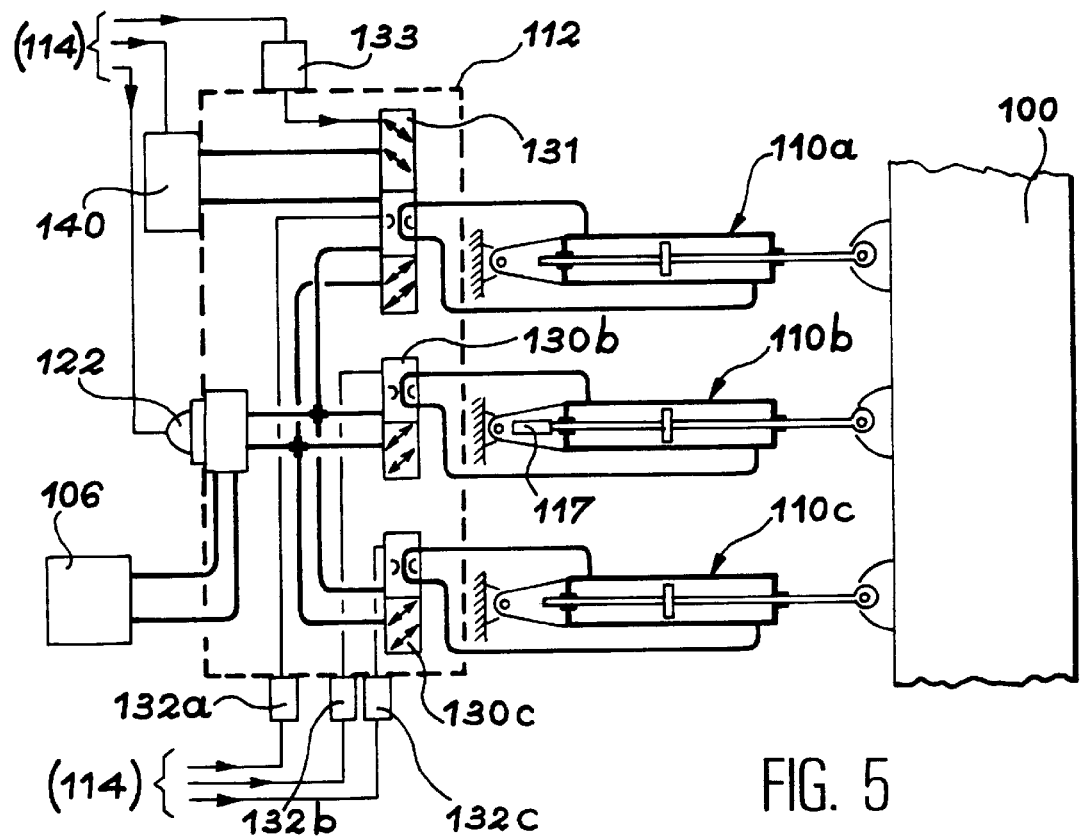
FIG. 5 is a simplified diagrammatic and enlarged view of a detail in FIG. 2 corresponding to one particular embodiment of the invention.

Another possible manner of making control blocks and energy sources is shown in FIG. 5.

The mechanism in FIG. 5 is identical to that shown in FIG. 4 except for the fact that the first two position mode drawers is replaced by a three-position mode drawer 131. This mode drawer may be actuated by a solenoid 133 and by a solenoid valve 132a. This equipment is controlled by the computer, not shown (but visible in FIG. 2).

In a first position of the mode drawer (solenoid excited), the jack chambers 110a are connected to the electro-hydrostatic module 140. In a second position of the mode drawer, the jack chambers 110a are connected to the hydraulic circuit 106 through servo valve 122. Finally, in a third embodiment of the mode drawer, (solenoid valve 132a and solenoid not excited), the jacks chambers 110a are connected to each other.

Therefore, the first jack 110a can operate according to a deactivated mode and according to 2 separate activated modes in which it is connected to different power sources.

The other two jacks 110b and 110c operate only according to a first activated or deactivated mode, in the same way as described above.

This type of embodiment can further increase the reliability of the control system.

Finally, according to the invention, the power of the actuators may be modulated by providing a variable number of jacks. An increase in the number of jacks can reduce their individual size and the modulable nature of the actuator power, as a function of the condition of flight phase, such that the size of power equipment can be reduced, particularly the dimensions of the required hydraulic equipment.

A control surface control system according to the invention may be applied to different control surfaces on an aircraft and is particularly useful for large carriers, due to the reduction in the mass and the size of the hydraulic circuits, and for supersonic aircraft, due to the reduced size of individual jacks.

DOCUMENTS MENTIONED (1) 747-400 upper rudder control system, pages 11–14 Aerospace Engineering—June 1992
(2) FR-2 569 787—B1

What is claimed is:

1. A control system for a control surface of an aircraft comprising:
   a control surface having at least one actuator, the actuator connected to a hydraulic circuit and equipped with at least two power jacks which operate in at least one activated mode and one deactivated mode; and
   a control unit for controlling a number of jacks operating in the activated mode depending on aircraft flight conditions associated with a non-failure aspect of operation, the aircraft flight conditions consisting of: take off, initial climb, cruising speed, descent, approach and taxiing.

2. The system according to claim 1, wherein the control unit is connected to at least one position sensor for the control surface, measurement equipment for aircraft flight parameters, and a piloting device, and is programmed to determine a minimum number of jacks necessary to cause a movement of the control surface with an amplitude corresponding to piloting order originating from the piloting device.

3. A control system for a control surface of an aircraft comprising:
   a control surface having at least one actuator, the actuator connected to a hydraulic circuit and equipped with at least two power jacks which operate in at least one activated mode and one deactivated mode;
   a control unit for controlling a number of jacks operating in the activated mode depending on aircraft flight conditions; and
   wherein the control unit calculates and distributes flight control orders depending on determined flight phases, and wherein the control unit is programmed to associated predetermined number of jacks that will operate in the activated mode, during a flight phase associated with a non-failure condition.

4. The system according to claim 3, wherein the aircraft flight conditions include take off, initial climb, cruising speed, descent, approach and taxing.

5. A control surface system comprising:
   a control surface having at least one actuator, the actuator connected to a hydraulic circuit and equipped with at least two power jacks which operate in at least one activated mode and one deactivated mode;
   a control unit for controlling the number of jacks operating in the activated mode depending on aircraft flight conditions, the flight conditions associated with a non-failure condition of the aircraft; and
   wherein each actuator comprises control blocks associated with power jacks controlled by the control unit to make the jacks operate selectively in an activated mode or a deactivated mode.

6. The system according to claim 5, wherein the jacks comprise two jacks chambers separated by a mobile piston, and wherein the control blocks comprise mode drawers that selectively connect the jack chambers to at least one hydraulic power source in the activated mode, and connects the jack chambers to each other in the deactivated mode.

7. The system according to claim 6, wherein a mode drawer is associated with each jack.

8. The system according to claim 6, further comprising a servo valve connected to the hydraulic circuit, the servo valve producing a hydraulic flow to the jacks in the activated mode, and the hydraulic circuit forming a first hydraulic power source.

9. The system according to claim 8, wherein each actuator comprises at least two jacks, each equipped with a mode drawer and wherein the servo valve is connected to each of the mode drawers.

10. The system according to claim 8, wherein at least one of the jacks is associated with a three-positioned mode drawer forming a passage between jack chambers in the deactivated mode, connecting the jack chambers to the servo valve in a first activated mode, and connecting the jack chambers to a standalone electro-hydrostatic module in a second activated mode, the electro-hydrostatic module forming a second local and standalone hydraulic power source.

11. The system according to claim 6, wherein at least one actuator comprises at least two power jacks, each equipped with a mode drawer, and wherein at least one of the jacks is associated with a servo valve connected to the hydraulic circuit forming a first hydraulic power source, and wherein at least one of the jacks is associated with a standalone electro-hydrostatic module forming a second local hydraulic power source.

12. The system according to claim 5, wherein the aircraft flight conditions include take off, initial climb, cruising speed, descent, approach and taxing.

13. A control process for an aircraft control surface maneuvered by at least one actuator, the actuator being connected to a hydraulic circuit and equipped with at least two power jacks capable of operation selectivity in an activated mode or a deactivated mode, the control process comprising: operating a number of jacks in the activated mode depending on a speed of an aircraft; and wherein a single jack is operable in the activated mode when the aircraft is operable during a non-failure flight condition and when the aircraft speed is within at least one first low speed range and wherein at least two jacks are made to operate in activated mode when the speed is in at least one second speed range exceeding speeds in the first range.

14. A control system for a control surface of an aircraft comprising:

a control surface having at least one actuator, the actuator connected to a hydraulic circuit and equipped with at least two power jacks which operate in at least one activated mode and one deactivated mode;

a control unit for controlling a number of jacks operating in the activated mode depending on aircraft flight conditions, the flight conditions associated with a non-failure condition of the aircraft; and wherein the control unit measures an aircraft speed and controls the number of jacks operating in the activated mode depending on the aircraft speed.

15. The system according to claim 14, wherein the aircraft flight conditions include take off, initial climb, cruising speed, descent, approach and taxing.

16. A control process for an aircraft control surface maneuvered by at least one actuator, the actuator being connected to a hydraulic circuit and equipped with at least two power jacks capable of operation selectivity in an activated mode or a deactivated mode, the control process comprising: operating a number of jacks in the activated mode depending on a speed of an aircraft when the aircraft is operating during a non-failure flight condition.

17. The system according to claim 16, wherein the aircraft flight conditions include take off, initial climb, cruising speed, descent, approach and taxing.

18. The process according to claim 16, further comprising a step of determining the number of jacks as a function of a flight phase corresponding to defined speeds.

19. A control process for an aircraft during a non-failure flight condition, the aircraft having a control surface maneuvered by at least one actuator, the actuator being connected to a hydraulic circuit and equipped with at least two power jacks capable of operating selectively in an activated mode or a deactivated mode, the control process comprising: operating a number of jacks in the activated mode depending on the force to be exerted on the control surface in order to obtain a required movement.

20. The system according to claim 19, wherein the aircraft flight conditions include take off, initial climb, cruising speed, descent, approach and taxing.

21. A control system for a control surface of an aircraft comprising:

a control surface having at least one actuator, the actuator connected to a hydraulic circuit and equipped with at least two power jacks which operate in at least one activated mode and one deactivated mode;

a control unit for controlling a number of jacks operating in the activated mode depending on aircraft flight conditions;

wherein the control unit calculates and distributes flight control orders depending on determined flight phases, and wherein the control unit is programmed to associated predetermined number of jacks that will operate in the activated mode; and wherein the control unit is connected to at least one position sensor for the control surface, measurement equipment for aircraft flight parameters, and a piloting device; and is programmed to determine a minimum number of jacks necessary to cause a movement of the control surface with an amplitude corresponding to piloting order originating from the piloting device.

22. A control system for a control surface of an aircraft comprising:

a control surface having at least one actuator, the actuator connected to a hydraulic circuit and equipped with at least two power jacks which operate in at least one activated mode and one deactivated mode;

a control unit for controlling a number of jacks operating in the activated mode depending on aircraft flight conditions;

wherein the control unit measures an aircraft speed and controls the number of jacks operating in the activated mode depending on the aircraft speed; and wherein the control unit is connected to at least one position sensor for the control surface, measurement equipment for aircraft flight parameters, and a piloting device; and is programmed to determine a minimum number of jacks necessary to cause a movement of the control surface with an amplitude corresponding to piloting order originating for the piloting device.

* * * * *